(12) United States Patent
Gan

(10) Patent No.: US 8,058,858 B2
(45) Date of Patent: *Nov. 15, 2011

(54) HIGH EFFICIENCY VOLTAGE REGULATOR WITH AUTO POWER-SAVE MODE

(75) Inventor: Ge Gan, Milpitas, CA (US)

(73) Assignee: Active-Semi, Inc. (VG)

( * ) Notice: Subject to any disclaimer, the term of this patent is extended or adjusted under 35 U.S.C. 154(b) by 0 days.

This patent is subject to a terminal disclaimer.

(21) Appl. No.: 12/806,624

(22) Filed: Aug. 16, 2010

(65) Prior Publication Data

US 2010/0315054 A1 Dec. 16, 2010

Related U.S. Application Data

(63) Continuation of application No. 12/079,257, filed on Mar. 24, 2008, now Pat. No. 7,800,351.

(51) Int. Cl.
*G05F 1/40* (2006.01)
(52) U.S. Cl. ............... 323/283; 323/222; 363/89
(58) Field of Classification Search .................. 323/222, 323/282–290, 271, 274, 276, 207; 363/41, 363/65, 97, 98, 89, 132, 21.12
See application file for complete search history.

(56) References Cited

U.S. PATENT DOCUMENTS

| | | | |
|---|---|---|---|
| 5,912,549 A | 6/1999 | Farrington et al. | 323/207 |
| 5,982,643 A | 11/1999 | Phlipot | 363/25 |
| 6,762,901 B2 | 7/2004 | Hill | 360/78.04 |
| 6,873,140 B2 * | 3/2005 | Saggini et al. | 323/283 |
| 7,038,514 B2 * | 5/2006 | Leith et al. | 327/198 |
| 7,307,390 B2 | 12/2007 | Huynh et al. | 315/291 |
| 7,382,114 B2 * | 6/2008 | Groom | 323/271 |
| 7,453,246 B2 * | 11/2008 | Qiu et al. | 323/282 |
| 7,498,793 B2 * | 3/2009 | Xu | 323/288 |
| 7,635,956 B2 | 12/2009 | Huynh et al. | 315/291 |

* cited by examiner

*Primary Examiner* — Rajnikant Patel
(74) *Attorney, Agent, or Firm* — Imperium Patent Works; Zheng Jin; Darien K. Wallace

(57) ABSTRACT

A DC-to-DC converter comprises an error amplifier, a comparator, a PWM controller, a power switch unit, and a control signal monitoring circuit. The PWM controller receives a comparison signal from the comparator and generates a digital control signal that controls the power switch unit such that the DC-to-DC converter supplies a regulated voltage onto a load. The control signal monitoring circuit monitors the digital control signal and detects either a heavy load or a light load condition based on characteristics of the digital control signal. Under the light load condition, the monitoring circuit generates a first enabling signal such that the DC-to-DC controller operates in a power-save mode. Under the heavy load condition, the monitoring circuit generates a second enabling signal such that the DC-to-DC controller operates in a normal operation mode. The DC-to-DC converter consumes substantially less power in the power-save mode than in the normal operation mode.

23 Claims, 4 Drawing Sheets

HIGH EFFICIENCY VOLTAGE REGULATOR WITH AUTO POWER-SAVE MODE

CROSS REFERENCE TO RELATED APPLICATION

This application is a continuation of, and claims priority under 35 U.S.C. §120 from, nonprovisional U.S. patent application Ser. No. 12/079,257 entitled "High Efficiency Voltage Regulator with Auto Power-Save Mode," filed on Mar. 24, 2008, now U.S. Pat. No. 7,800,351, the subject matter of which is incorporated herein by reference.

TECHNICAL FIELD

The disclosed embodiments relate to the field of power conversion, and more specifically, to high efficiency DC-to-DC voltage regulators having pulse-width modulation controllers.

BACKGROUND INFORMATION

A DC-to-DC converter is a voltage regulator that converts an input direct current voltage to a regulated output direct current voltage. Among different types of voltage regulators, switching regulators are increasing in popularity because they offer higher power conversion efficiency and design flexibility. A switching regulator typically uses a power switch, an inductor, and a diode to transfer energy from input to output. A feedback and control mechanism is used to provide a regulated output voltage. The most commonly used feedback and control mechanism is pulse-width modulation (PWM).

FIG. 1 (Prior Art) is a block diagram of a DC-to-DC converter 100 that generates a regulated output voltage VOUT. DC-to-DC converter 100 includes a PWM controller 101, a power switch unit 102, a comparator 103, an error amplifier 104, an inductor 105, a voltage divider network 106 formed by resistors 121 and 122, an output capacitor 107, and a load 108. PWM controller 101 includes a sequential logic element (for instance, an SR-latch circuit) 110. Power switch unit 102 includes a switch device 111 and a current sense amplifier 112. During operation, a control signal 116 is provided to control the ON and OFF states of power switch unit 102. The control signal 116 is a square wave with an adjustable duty cycle that is controlled by PWM controller 101. If the output voltage VOUT is higher than a desired regulation voltage VREG, then the ON time of switch device 111 is decreased so that VOUT is also decreased. Similarly, if the output voltage VOUT is lower than VREG, then the ON time of switch device 111 is increased so that VOUT is also increased. The output voltage VOUT is thus regulated by adjusting the duty cycle of control signal 116.

As illustrated in FIG. 1, control signal 116 typically has a relatively high frequency (for instance, 1.6 MHZ) for the output voltage VOUT to be filtered and converted to a DC voltage. A significant amount of power is therefore used to turn switch device 111 on and off frequently. This large amount of power used for switching results in low efficiency (output power/total power consumption) of DC-to-DC converter 100. The efficiency of a DC-to-DC converter is further reduced when operating under a light load condition with low output current. Accordingly, various techniques have been utilized to reduce the power lost to switching and thereby to increase the efficiency of the DC-to-DC converter. In the example of FIG. 1, the switching power loss is reduced by decreasing the switching frequency of switch device 111 when DC-to-DC converter 100 operates under a light load condition. Other improvements are desirable to further reduce the overall power loss and thereby increase the efficiency of a DC-to-DC converter.

SUMMARY

A DC-to-DC converter comprises an error amplifier, a PWM comparator, a PWM controller, a power switch unit, and a control signal monitoring circuit. The error amplifier compares a feedback voltage to a reference voltage and outputs an error signal. The PWM comparator compares the error signal to a ramp signal and outputs a comparison signal. The PWM controller receives the comparison signal from the PWM comparator and generates a digital control signal that controls the power switch unit such that the DC-to-DC converter supplies a regulated output voltage onto a load. The control signal monitoring circuit monitors the digital control signal and detects either a heavy load condition or a light load condition based on the characteristics of the digital control signal. Under the light load condition, the control signal monitoring circuit generates a first enabling signal such that the DC-to-DC controller operates in a power-save mode. Under the heavy load condition, the control signal monitoring circuit generates a second enabling signal such that the DC-to-DC controller operates in a normal operation mode. The DC-to-DC converter consumes substantially less power in the power-save mode than in the normal operation mode.

The control signal monitoring circuit detects the heavy load condition and the light load condition based on characteristics of the digital control signal. In one embodiment, the control signal monitoring circuit comprises a timer and a sequential logic element, such as an SR latch circuit. Under the light load condition, the timer monitors the digital control signal and outputs a digital value when the digital control signal remains unchanged for a predetermined time period. As a result, the sequential logic element receives the digital value and outputs the first enabling signal in response to the digital value. Under the heavy load condition, the sequential logic element outputs the second enabling signal when the digital control signal changes from a digital low to a digital high.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
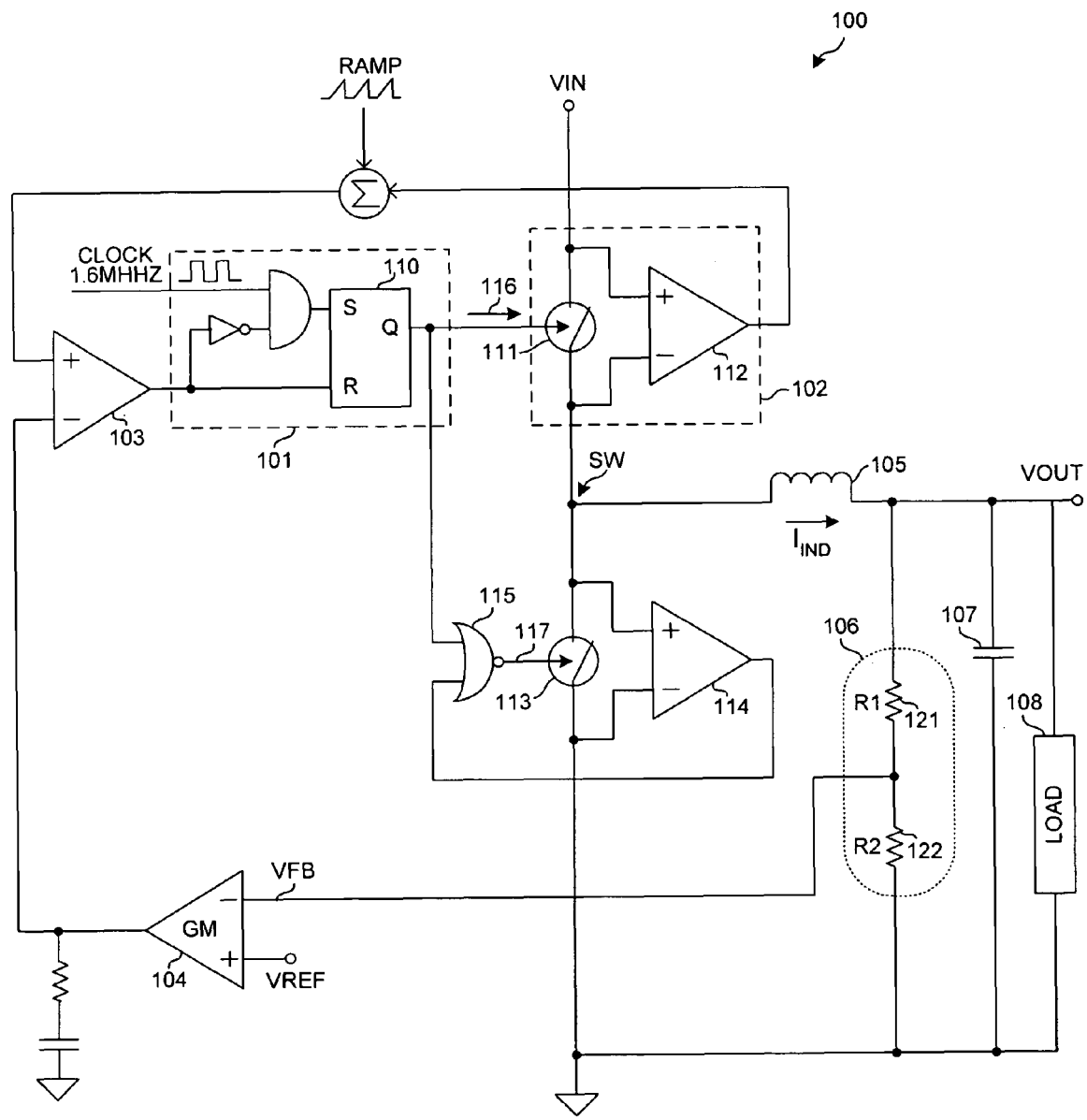
FIG. 1 (Prior Art) is a block diagram of a DC-to-DC converter 100.
Figure 2:
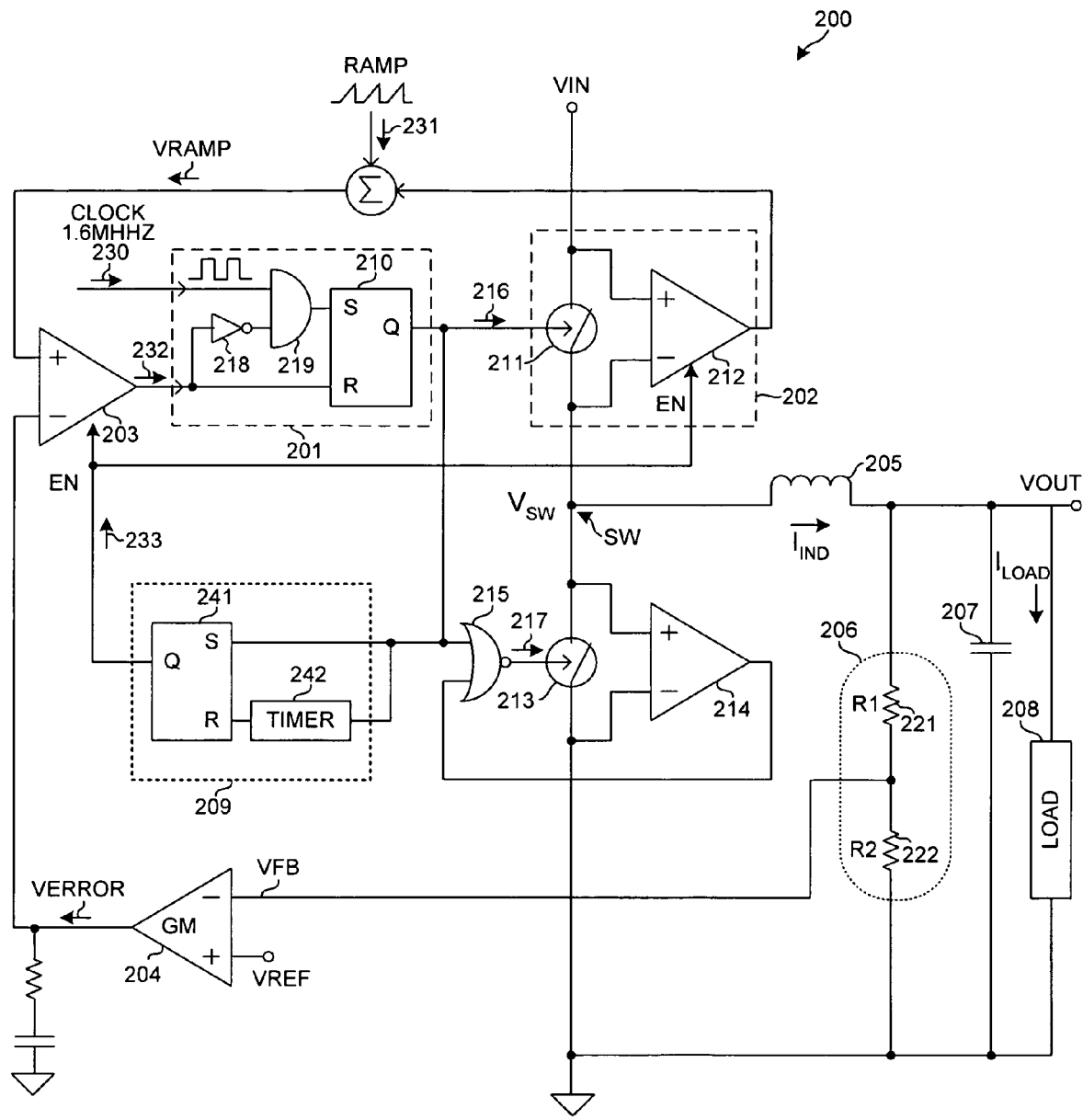
FIG. 2 is a block diagram of a DC-to-DC converter 200 in accordance with one novel aspect.

FIG. 2 is a block diagram of a DC-to-DC converter 200 in accordance with one novel aspect. DC-to-DC converter 200 includes a Pulse-Width Modulation (PWM) controller 201, a power switch unit 202, a PWM comparator 203, an error amplifier 204, an inductor 205, a voltage divider network 206 formed by resistors 221 and 222, an output capacitor 207, a load 208, and a control signal monitoring circuit 209. PWM controller 201 includes a sequential logic element (for instance, an SR latch circuit) 210, an inverter 218, and an AND gate 219. Power switch unit 202 includes a switch device 211 and a current sense amplifier 212. Control signal monitoring circuit 209 includes a sequential logic element (for instance, an SR latch circuit) 241 and a timer 242. DC-to-DC converter 200 further includes a synchronous rectifier 213, a comparator 214, and a NOR gate 215.

DC-to-DC converter 200 is supplied by an input DC voltage VIN and outputs a regulated DC voltage VOUT. During the operation of DC-to-DC converter 200, a square wave input signal (CLOCK) 230 is provided to PWM controller 201. PWM controller 201 in turn outputs a square wave digital control signal 216 with an adjustable duty cycle to control the ON and OFF states of power switch unit 202. When digital control signal 216 has a value of digital one, switch device 211 is turned on and the input voltage VIN is forced across inductor 205. An inductor current $I_{IND}$ flows into both load 208 and output capacitor 207. Output capacitor 207 charges during the ON time ($t_{ON}$). On the other hand, when digital control signal 216 has a value of digital zero, switch device 211 is turned off and synchronous rectifier 213 is turned on. The inductor current $I_{IND}$ continues to flow through load 208 and also flows through synchronous rectifier 213. Output capacitor 207 discharges during the OFF time ($t_{OFF}$), contributing to the total current being supplied to load 208. In a steady-state operating condition, the average voltage across an inductor over the entire switching cycle is zero. As a result, ignoring efficiency loss, the output voltage VOUT can be expressed according to equation (1) as follows:

$$VOUT=VIN(t_{ON}/(t_{ON}+t_{OFF})) \quad (1)$$

Therefore, by adjusting the duty cycle ($t_{ON}/(t_{ON}+t_{OFF})$) of digital control signal 216, the output voltage VOUT can be regulated at a desired voltage VREG.

PWM controller 201 utilizes a feedback mechanism to control the ON and OFF states of power switch unit 202. As illustrated in FIG. 2, a sample of the output voltage VOUT is divided by voltage divider network 206 and compared to a reference VREF by error amplifier 204, which provides an amplified error signal VERROR. Amplified error signal VERROR is supplied to an inverting input lead of PWM comparator 203. An oscillator ramp signal (RAMP) 231 is summed with an output signal of current sense amplifier 212 to establish a voltage ramp signal VRAMP. Voltage ramp signal VRAMP is supplied to a non-inverting input lead of PWM comparator 203. VERROR and VRAMP are then compared by PWM comparator 203 to provide a comparison signal 232 to PWM controller 201. PWM controller 201 receives both CLOCK signal 230 and comparison signal 232 and in response generates digital control signal 216.

Figure 3:
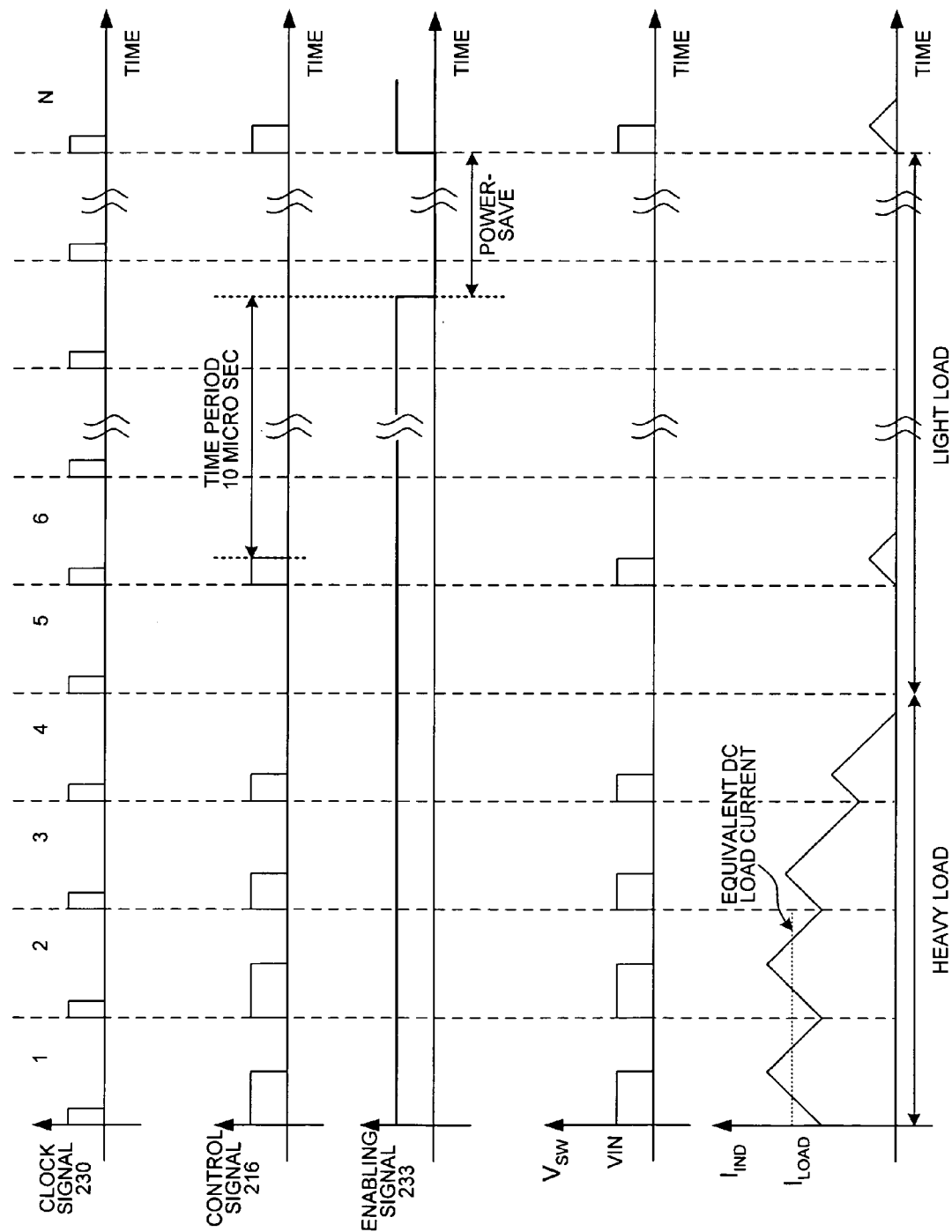
FIG. 3 illustrates waveform diagrams of various signals during the operation of a DC-to-DC converter.

FIG. 3 illustrates waveform diagrams of various signals such as CLOCK signal 230 and digital control signal 216 during the operation of DC-to-DC converter 200. As illustrated in FIG. 3, CLOCK signal 230 is a square wave having a fixed high frequency (for instance, a frequency of 1.6 MHZ). Each clock pulse of CLOCK signal 230 initiates an "ON" cycle by providing the set input lead of SR latch 210 a digital high. During the "ON" cycle, SR latch 210 outputs control signal 216 with a digital high which turns on switch device 211. Switch device 211 routes the inductor current $I_{IND}$ through capacitor 207 and load 208 and brings up the output voltage VOUT. In addition, voltage ramp signal VRAMP increases as the inductor current $I_{IND}$ increases. Eventually, VRAMP becomes larger than VERROR and PWM comparator 203 outputs comparison signal 232 with a digital high. The reset input lead of SR latch 210 receives the digital high comparison signal and in response outputs control signal 216 with a digital low. The digital low control signal turns off switch device 211 such that power switch unit 202 enters an "OFF" cycle. During the "OFF" cycle, the inductor current $I_{IND}$ flows through synchronous rectifier 213 until switch device 211 is turned on again in the next "ON" cycle. Under a heavy load condition with a relatively large load current, this process repeats for every clock cycle of CLOCK signal 230. As illustrated in FIG. 3, PWM controller 201 generates control signal 216 having a square wave of the same frequency as CLOCK signal 230 under the heavy load condition. Therefore, under the heavy load condition, switch device 211 is switched on in every clock cycle to transfer energy from input to output. In one example, switch device 211 is a MOSFET transistor. A significant amount of power is thus used to charge the gates of the transistor under the heavy load condition due to the high switching frequency.

FIG. 3 also illustrates a voltage curve of the voltage $V_{SW}$ at node SW and a current curve of the inductor current $I_{IND}$. As illustrated in FIG. 3, voltage $V_{SW}$ has a similar waveform and duty cycle as digital control signal 216. The inductor current $I_{IND}$ ramps up when $V_{SW}$ is high (during an "ON" cycle) and ramps down when $V_{SW}$ is low (during an "OFF" cycle). When the load current $I_{LOAD}$ decreases, the duty cycle of control signal 216 is reduced, and the inductor current $I_{IND}$ ramps up less and ramps down more (see clock cycles 3 and 4 as illustrated in FIG. 3). As a result, the inductor current $I_{IND}$ gradually discharges and the equivalent DC load current $I_{LOAD}$ decreases as desired.

In most DC-to-DC converter applications, the inductor current $I_{IND}$ never drops to zero during heavy load operation (sometimes also referred to as a continuous conduction mode operation). However, in applications where the load current is fairly low, a skip mode operation (which utilizes a discontinuous conduction mode operation) is more advantageous for improved efficiency. In skip mode operation, a new switching cycle is initiated only when the output voltage VOUT drops below the desired regulation voltage VREG and the switching frequency is proportional to the load current $I_{LOAD}$.

In the example of FIG. 2, DC-to-DC converter 200 operates in the skip mode under a light load condition. When the load current $I_{LOAD}$ remains small for a period of time, the output voltage VOUT remains higher than the desired regulation voltage VREG. Error signal VERROR thus remains lower than ramp signal VRAMP, and PWM comparator 203 thus outputs comparison signal 232 with a digital high. As a result, the rising-edge of CLOCK signal 230 is masked by the digital high comparison signal through an inverter 218 and an AND gate 219. Therefore, SR latch circuit 210 no longer generates control signal 216 with a digital high for every clock cycle. As illustrated in FIG. 3, control signal 216 skips a pulse in clock cycle 5. Skipping clock cycles allows the inductor current to discharge to zero. Skipping clock cycles also reduces the high power loss because switch device 211 remains off during the skipped clock cycles. Higher efficiency is thus achieved for DC-to-DC converter 200 by operating in the skip mode under the light load condition.

To achieve high efficiency, a synchronous rectifier (for instance, a MOSFET switch) 213 is also used in the example of FIG. 2. When MOSFET switch 213 is turned on, current normally flows from source to drain and allows the inductor current $I_{IND}$ to flow through. Because of a very low channel resistance, MOSFET switch 213 replaces a rectifying diode and the standard forward drop of the rectifying diode can be reduced to a few millivolts. It is however, also possible for the inductor current $I_{IND}$ to flow in reverse direction if MOSFET switch 213 remains on. As illustrated in FIG. 2, comparator 214 is coupled to and controls MOSFET 213 to block any reverse current. Synchronous rectifier 213 and comparator 214 together form an ideal diode, which improves light load efficiency.

Although the adoption of the skip mode operation and the synchronous rectifier significantly improves the efficiency of DC-to-DC converter 200, the internal circuitry of DC-to-DC converter 200 also consumes a large amount of power and would contribute to overall power loss and lower efficiency if the internal circuitry were not disabled during skip mode operation. For example, PWM comparator 203, error amplifier 204, and current sense amplifier 212 each consumes a large supply current in order to operate properly under a relatively high clock frequency. Under the light load condition, when these circuits are inactive, such a large supply current is unnecessary because DC-to-DC converter 200 operates in the skip mode with a much lower switching frequency.

In one novel aspect, DC-to-DC converter 200 has two operational modes under the light load condition: a normal operational mode and a special power-save mode. In the example of FIG. 2, control signal monitoring circuit 209 is used for DC-to-DC converter 200 to enter and exit the special power-save mode by outputting a power-save mode enabling signal 233. Control signal monitoring circuit 209 includes a sequential logic element (for instance, an SR latch circuit) 241 and a timer 242. A set input lead of SR latch 241 is coupled to the output of PWM controller 201 to receive digital control signal 216. An input lead of timer 242 is also coupled to the output of PWM controller 201 to receive digital control signal 216. An output lead of timer 242 is coupled to a reset input lead of SR latch 241. Under the heavy load condition, for each pulse of control signal 216, the set input lead of SR latch 241 receives a rising-edge signal and in response outputs a first enabling signal 233 with a digital high such that DC-to-DC converter operates in a normal operation mode.

As illustrated above with respect to the skip mode operation, when DC-to-DC converter operates under the light load condition, digital control signal 216 skips clock cycles and remains unchanged with a value of a digital low. If the load current $I_{LOAD}$ is extremely small, then digital control signal 216 may skip many clock cycles and remain unchanged for a long period of time. Timer 242 counts such time period whenever digital control signal 216 remains as a digital low. When the time period reaches a predetermined duration (for instance, a time period of 10 microseconds as illustrated in FIG. 3), timer 242 outputs a digital high to the reset input lead of SR latch 241. SR latch 241 in response outputs a second enabling signal 233 with a digital low such that DC-to-DC converter 200 enters into a special power-save mode. More specifically, both PWM comparator 203 and current sense amplifier 212 receive the second enabling signal 233 of a digital low and enter into the special power-save mode. In the special power-save mode, both PWM comparator 203 and current sense amplifier 212 consume much less supply current and thus conserve significant amounts of power.

Later on, when the load current $I_{LOAD}$ increases, the output voltage VOUT again drops lower than the desired regulation voltage VREG. Error amplifier 204 outputs error signal VERROR that is higher than ramp signal VRAMP. As a result, PWM comparator 203 outputs comparison signal 232 with a digital low and unmasks the CLOCK signal 230. PWM controller 201 thus initiates a new "ON" cycle (for instance, clock cycle N as illustrated in FIG. 3) of control signal 216 to turn on power switch unit 202. As illustrated in FIG. 3, this new pulse of control signal 216 resets timer 242 and also causes SR latch 241 to output the first enabling signal 233 with a digital high. DC-to-DC converter 200 thus returns back to the normal operational mode.

By detecting the light load condition and the heavy load condition based on the characteristics of digital control signal 216, DC-to-DC converter 200 is able to switch between the normal operation mode and the power-save mode automatically, without directly sensing the load current or output voltage. In one example, the heavy load condition can be detected when digital control signal 216 simply changes from a digital low to a digital high. As explained above, the change of control signal 216 from a digital low to a digital high indicates a relatively heavy load condition because more energy needs to be transferred from input to output in order to maintain the regulated output voltage. On the other hand, the light load condition can be detected when digital control signal 216 remains unchanged for a period of time. If control signal 216 skips at least a couple of clock cycles and remains unchanged, then it indicates that the load current is very small and the output voltage maintains above the regulated voltage without more energy being transferred from the input side. For instance, if the frequency of CLOCK signal 230 is 1.6 MHZ (which means that each clock cycle is 625 nanoseconds long), then the period of time can be selected to be five or ten microseconds.

The power-save mode allows DC-to-DC converter 200 to consume much less power and to achieve higher efficiency in the light load condition. In one example, up to 100 micro amps of supply current can be saved for PWM comparator 203 and current sense amplifier 212 in the power-save mode. This feature is particularly useful in electronic devices such as a portable audio player having an internal DC-to-DC converter. When the portable audio player is not actively playing audio, it goes to an inactive mode and demands very small current without being turned off. By detecting such light load condition and automatically switching to a power-save mode, the internal DC-to-DC converter of the portable audio player consumes extremely low power from its internal battery and the battery is therefore able to last for a longer time.

Figure 4:
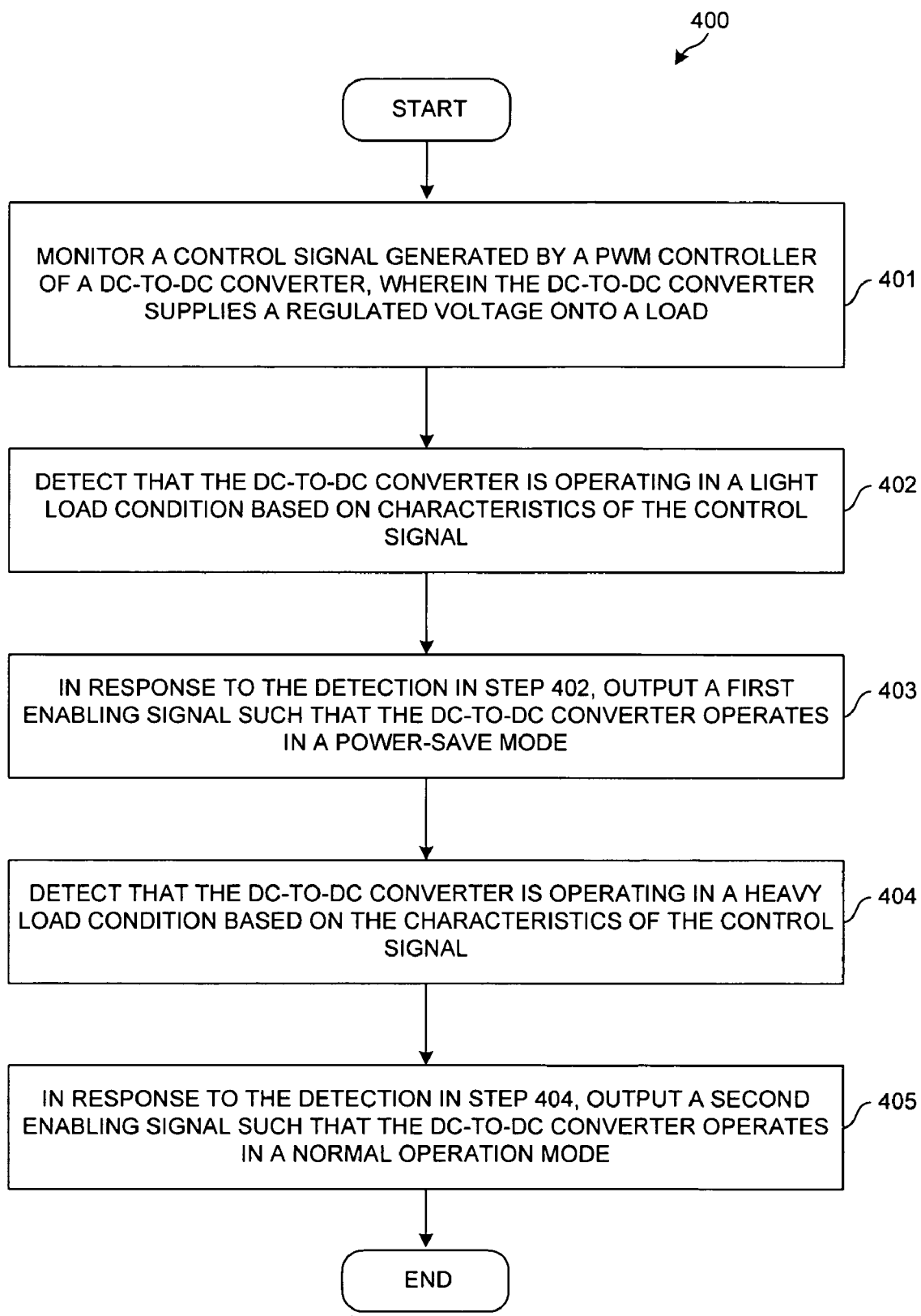
FIG. 4 is a flowchart of a method 400 in accordance with one novel aspect.

FIG. 4 is a flowchart of a method 400 in accordance with one novel aspect. A digital control signal generated by a PWM controller of a DC-to-DC converter is monitored in step 401. The DC-to-DC converter supplies a regulated output voltage onto a load. When the DC-to-DC converter has a relatively small load current, a light load condition is detected (step 402) based on the characteristics of the digital control signal, such as the pattern of the digital control signal. In response to the detection in step 402, a first enabling signal is outputted (step 403) such that the DC-to-DC converter operates in a special a power-save mode. When the DC-to-DC converter has a relatively large load current, a heavy load condition is then detected (step 404) based on the characteristics of the digital control signal. In response to the detection in step 404, a second enabling signal is outputted (step 405) such that the DC-to-DC converter operates in a normal operation mode. The DC-to-DC converter consumes much less power in the power-save mode than in the normal operation mode and thereby achieves higher efficiency in the light load condition.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A DC-to-DC converter, comprising:
   an amplifier that compares a feedback voltage to a reference voltage and outputs an error signal;
   a comparator that compares the error signal to a ramp signal and outputs a comparison signal;
   means for controlling the DC-to-DC converter to operate in a power-save mode in response to a digital control signal being in a light load condition; and
   a controller that receives the comparison signal and outputs the digital control signal, wherein the digital control signal is used to control the means such that the DC-to-DC converter supplies a regulated voltage onto a load.

2. The DC-to-DC converter of claim 1, further comprising:
   a control signal monitoring circuit that monitors the digital control signal, wherein the control signal monitoring circuit detects the digital control signal being in the light load condition and in response thereto outputs a first enabling signal that is received by the comparator and by the means.

3. The DC-to-DC converter of claim 2, wherein the control signal monitoring circuit detects the digital control signal being in a heavy load condition, and wherein the means for controlling causes the DC-to-DC converter to operate in a normal mode in response to the digital control signal being in the heavy load condition.

4. The DC-to-DC converter of claim 3, wherein the DC-to-DC converter consumes less power in the power-save mode than in the normal operation mode.

5. The DC-to-DC converter of claim 3, wherein the comparator has a substantially smaller power consumption in the power-save mode than in the normal operation mode.

6. The DC-to-DC converter of claim 3, wherein the means comprises a switch and a current amplifier, and wherein the current amplifier has a substantially smaller power consumption in the power save mode than in the normal operation mode.

7. The DC-to-DC converter of claim 2, wherein the control signal monitoring circuit detects the digital control signal being in a heavy load condition and in response thereto outputs a second enabling signal that is received by the comparator and by the means.

8. The DC-to-DC converter of claim 2, wherein the control signal monitoring circuit comprises:
   a timer that monitors the digital control signal and outputs a digital value when the digital control signal remains unchanged for a predetermined time period; and
   a sequential logic element that outputs the first enabling signal in response to the digital value.

9. The DC-to-DC converter of claim 8, wherein the sequential logic element outputs the second enabling signal when the digital control signal changes from a digital low to a digital high.

10. The DC-to-DC converter of claim 8, wherein the sequential logic element is taken from the group consisting of: a flip-flop circuit, and an SR latch circuit.

11. A method, comprising:
    (a) monitoring a digital control signal generated by a controller of a DC-to-DC converter, wherein the DC-to-DC converter supplies a regulated voltage onto a load;
    (b) detecting that the DC-to-DC converter is operating in a light load condition based on characteristics of the digital control signal; and
    (c) operating the DC-to-DC converter in a power-save mode in response to the detecting in (b).

12. The method of claim 11, wherein the light load condition is detected in (b) by determining that the digital control signal remains unchanged for a predetermined time period.

13. The method of claim 11, further comprising:
    (d) detecting that the DC-to-DC converter is operating in a heavy load condition based on the characteristics of the digital control signal; and
    (e) operating the DC-to-DC converter in a normal mode in response to the detecting in (b).

14. The method of claim 13, wherein the heavy load condition is detected in (d) by determining that the digital control signal changes from a digital low to a digital high.

15. The method of claim 13, wherein the DC-to-DC converter consumes less power in the power-save mode than in the normal operation mode.

16. A DC-to-DC converter comprising:
    a power switch unit that receives a digital control signal, wherein the digital control signal controls the power switch unit such that the DC-to-DC converter a regulated voltage onto a load; and
    means for monitoring the digital control signal, wherein the means detects a light load condition based on characteristics of the digital control signal and in response thereto causes the DC-to-DC converter to operate in a power-save mode.

17. The DC-to-DC converter of claim 16, wherein the light load condition is detected by determining that the digital control signal remains unchanged for a predetermined time period.

18. The DC-to-DC converter of claim 16, wherein the means also detects a heavy load condition based on the characteristics of the digital control signal and in response thereto causes the DC-to-DC converter to operate in a normal operation mode.

19. The DC-to-DC converter of claim 18, wherein the heavy load condition is detected by determining that the digital control signal changes from a digital low to a digital high.

20. The DC-to-DC converter of claim 18, wherein the DC-to-DC converter consumes less power in the power-save mode than in the normal operation mode.

21. The DC-to-DC converter of claim 1, wherein the DC-to-DC converter is part of a portable audio player.

22. The method of claim 11, wherein the characteristics of the digital control signal include a pattern of the digital control signal.

23. The DC-to-DC converter of claim 16, wherein the means detects the light load condition without directly sensing a current supplied to the load.

* * * * *